United States Patent [19]

Uehara

[11] Patent Number: 4,701,151

[45] Date of Patent: Oct. 20, 1987

[54] PROPELLER DAMPING ARRANGEMENT FOR MARINE PROPULSION DEVICE

[75] Inventor: Hidehiko Uehara, Shizuoka, Japan

[73] Assignee: Sanshin Kogyo Kabushiki Kaisha, Japan

[21] Appl. No.: 541,170

[22] Filed: Oct. 12, 1983

[30] Foreign Application Priority Data

Oct. 13, 1982 [JP] Japan ............................ 57-178453

[51] Int. Cl.⁴ ............................ F16D 3/76; B63H 1/14
[52] U.S. Cl. ............................ 464/89; 416/134 R; 464/75; 464/85; 464/92
[58] Field of Search ............................ 464/73–75, 464/87–89, 91–96, 85, 83; 416/134 R

[56] References Cited

U.S. PATENT DOCUMENTS

| | | | |
|---|---|---|---|
| 2,164,485 | 7/1939 | Yantis | 464/37 |
| 2,164,744 | 7/1939 | Huth | 464/89 X |
| 2,235,605 | 3/1941 | Bugatti | 464/89 X |
| 2,564,605 | 8/1951 | Martin | 464/89 X |
| 2,974,502 | 3/1961 | Radcliffe | 464/89 |
| 3,045,763 | 7/1962 | Perrott | 464/83 X |
| 3,047,074 | 7/1962 | Rielag | 416/134 R X |
| 3,096,106 | 7/1963 | Wanner | 416/134 R X |
| 3,307,634 | 3/1967 | Bihlmire | 416/134 R X |
| 3,477,794 | 11/1969 | Abbott et al. | 416/134 R |
| 3,576,336 | 4/1971 | Uhlig | 416/134 R X |
| 3,748,061 | 7/1973 | Henrich | 416/134 R X |
| 4,452,591 | 6/1984 | Fishbaugh et al. | 464/89 |
| 4,486,181 | 12/1984 | Cavil | 416/134 R X |

Primary Examiner—John Petrakes
Attorney, Agent, or Firm—Ernest A. Beutler

[57] ABSTRACT

A number of embodiments of coupling arrangements for coupling a propeller to a driving shaft that permit a higher degree of resilience in a circumferential direction than in an axial direction. As a result, the coupling may be designed so as to offer high degree of vibration damping while affording good resistance to axial driving thrust. In addition, each embodiment is designed so as to provide more resilience in the reverse drive condition than in the forward drive condition.

22 Claims, 5 Drawing Figures

PROPELLER DAMPING ARRANGEMENT FOR MARINE PROPULSION DEVICE

BACKGROUND OF THE INVENTION

This invention relates to a propeller damping arrangement for marine propulsion devices and more particularly to an improved coupling and cushion for drivingly connecting a propeller to a driving shaft.

In most forms of marine propulsion, a propeller is utilized for driving a watercraft through the water. The blades of the propeller and their cooperation with the water, however, tend to cause vibrations which can be both objectionable to the occupants of the boat and may, in extreme cases, damage the running components. It has, therefore, been the practice to provide a flexible coupling between the propeller and its driving shaft which normally comprises an elastomeric sleeve through which the driving forces are transmitted. Although theoretically such an arrangement may provide adequate vibration damping, in practice these devices cannot provide sufficient resilience. In view of the fact that the driving forces must be transmitted through the elastomeric sleeve, it is necessary to use, with prior art constructions a relatively rigid sleeve so as to transmit these driving forces. As a result, the sleeves with the prior art constructions are too rigid to effectively dampen the normal running vibrations.

It is, therefore, a principal object of this invention to provide an improved vibration damping coupling for a marine drive.

It is another object of this invention to provide a marine drive coupling that is effective to absorb normal vibrations and yet which has sufficient rigidity to transmit driving forces.

Most marine drives employ a forward, neutral, reverse tranmission so that the boat or associated watercraft may be driven either in a forward or rearward direction. The driving forces transmitted in the forward direction are always considerably greater than those in reverse. However, the couplings heretofore employed have provided the same degree of vibration resistance in both directions.

It is, therefore, a still further object of this invention to provide a coupling arrangement for a marine drive that offers more resilience in the reverse mode than in the forward mode.

SUMMARY OF THE INVENTION

A first feature of this invention is adapted to be embodied in a coupling arrangement for drivingly connecting a propeller to a driven shaft. The coupling arrangement comprises resilient means interposed between the driving shaft and the propeller with the resilient means being more resilient in a circumferential direction than in an axial direction for absorbing torsional vibrations while offerng more resistance to axial deflections.

Another feature of the invention is adapted to be embodied in a coupling arrangement for drivingly connecting a propeller to a driving shaft. Such a coupling arrangement includes resilient means interposed between the driving shaft and the propeller and through which driving forces are transmitted. The resilient means is more rigid in one axial direction than in the opposite axial direction for affording more damping in one direction than in the other direction.

DETAILED DESCRIPTION OF THE PREFERRED EMBODIMENTS

Figure 1:
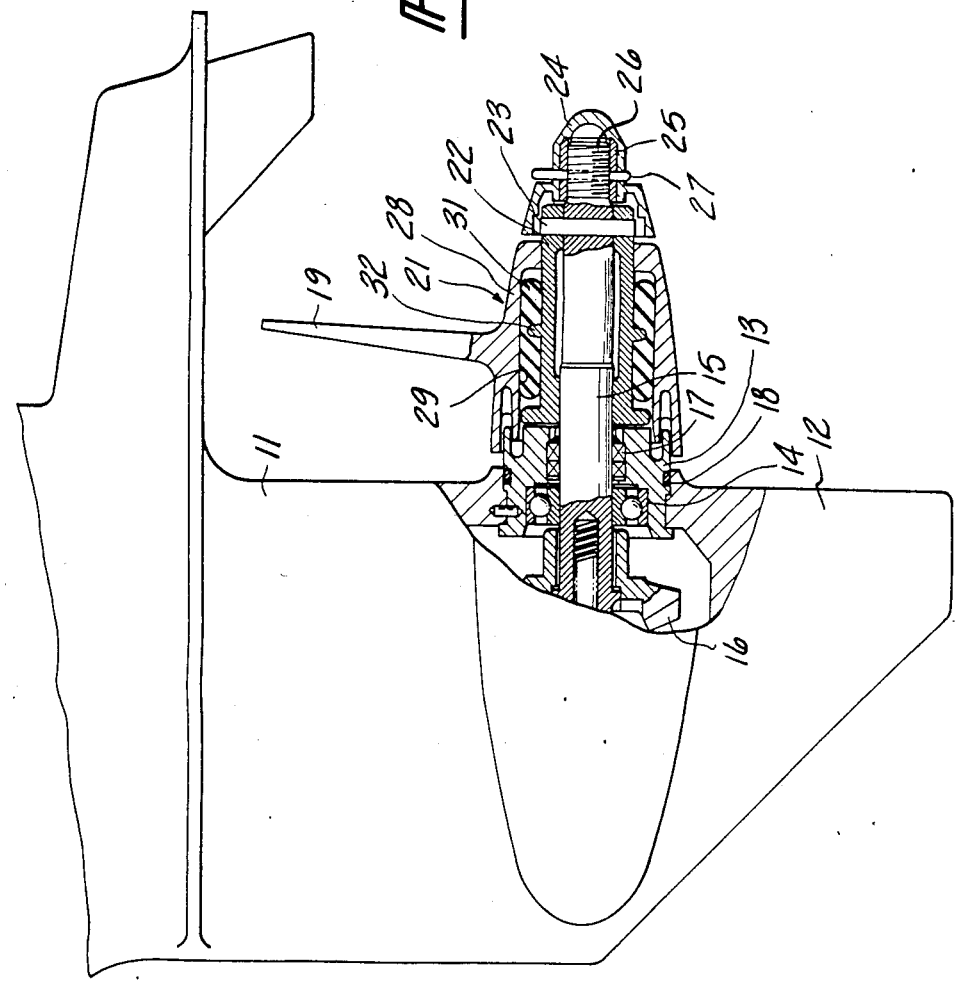
FIG. 1 is a side elevational view of a marine drive constructed in accordance with a first embodiment of the invention, with the coupling arrangement shown in cross-section.
Figure 2:
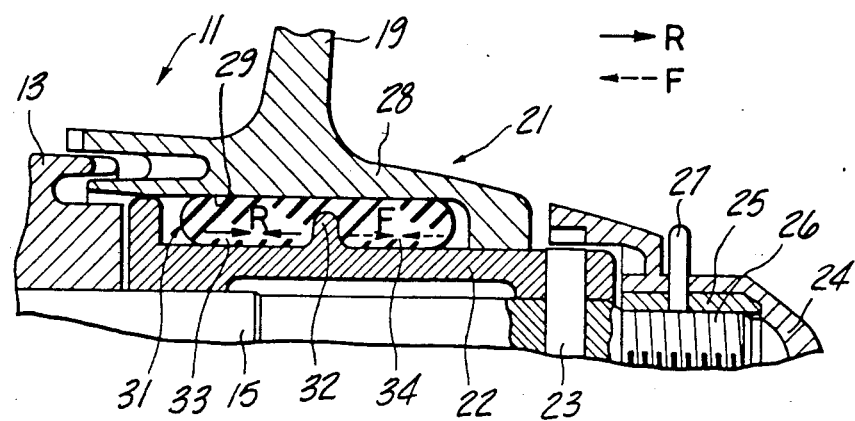
FIG. 2 is an enlarged cross-sectional view of the coupling arrangement of the embodiment shown in FIG. 1.

Referring first to the embodiment of FIGS. 1 and 2, a marine drive constructed in accordance with this embodiment is identified generally by the reference numeral 11. The marine drive 11 may comprise the lower unit of an outboard motor, or the outboard drive portion of an inboard-outboard drive. Of course, certain facts of the invention may be used in conjunction with other types of marine drives wherein a propeller is used for propulsion.

The marine drive 11 includes a housing assembly 12 having an opening in which a bushing 13 is affixed. The bushing 13 supports a bearing 14 which, in turn, rotatably journals one end of a driving shaft 15. The opposite end of the driving shaft 15 is also supported by means of an antifriction bearing in the housing 12 in a known manner. A forward, neutral, reverse transmission including a driven gear, partially shown at 16, is provided for coupling a prime mover (not shown) with the driving shaft 15 so as to rotate the shaft 15 in a forward or reverse condition or so as to provide a neutral condition.

The bushing 13 supports a seal 17 that sealingly engages the driving shaft 15 so as to preclude the leakage of water into the housing 12. In a like manner, a seal 18 is interposed between the bushing 13 and the surrounding hole of the housing 12 so as to prevent leakage in this area.

A propeller 19 is drivingly coupled to the driving shaft 15 by means of a coupling constructed in accordance with a first embodiment of the invention and identified generally by the reference numeral 21. The coupling 21 includes an inner sleeve 22 that encircles the driving shaft 15 and which is rotatably coupled to it by means of a shear pin 23. The shear pin 23 is concealed within a cap nut 24 having a threaded portion 25 that is received on a threaded end 26 of the drive shaft 15. A key 27 extends through suitable apertures for affixing the cap nut 24 to the driving shaft 15.

The propeller 19 has an annular hub portion 28 that has an internal bore 29 that is spaced radially outwardly from the outer diameter of the sleeve 22. An annular elastomeric element, indicated generally by the reference numeral 31, is received between the counterbore 29 and the outer periphery of the sleeve 22. The construction as thus far described is conventional. With conventional constructions of this type, the elastomeric element 31 must be relatively rigid since driving forces are transmitted through it between the drive shaft 15 and the propeller 19. Thus, circumferential or torsional vibrations cannot be very effectively damped due to the rigidity of the prior art type fo constructions. In accordance with this invention, however, an arrangement is provided for making the elastomeric element 31 more rigid in an axial direction than it is in a circumferential direction. Hence, a relatively resilient elastomric member 31 may be provided which will effectively damp torsional vibrations but which will offer sufficient rigidity so as to take the driving forces.

In accordance with this embodiment of the invention, the rigidity in the axial direction is increased by providing a circumferentially extending rib or protuberance 32 on the outer periphery of the sleeve 22 which protuberance extends into and displaces a central portion of the elastomeric member 31. In accordance with this embodiment, the protuberance 32 is not positioned on the midpoint of the elastomeric sleeve 31 but rather is displaced so that the sleeve 31 is divided into unequal length parts 33 and 34. When the propeller 19 is driving the associated watercraft in a forward direction, the loading from the propeller 19 to the sleeve 22 will be transmitted through the portion 34 which is shorter in length than the portion 33. The forward driving forces are shown by the broken line arrows in FIG. 2. When travelling in a reverse mode, the driving forces are transmitted through the elastomeric sleeve section 33 which is longer. Therefore, the sleeve portion 33 offers more resilience than does the portion 34 and the coupling arrangement 21 provides more rigidity when driving in a forward direction than in a reverse direction. Thus, the larger loads encountered during forward travel are taken by the coupling 31 while in reverse direction more resilience and vibration damping is achieved.

Figure 3:
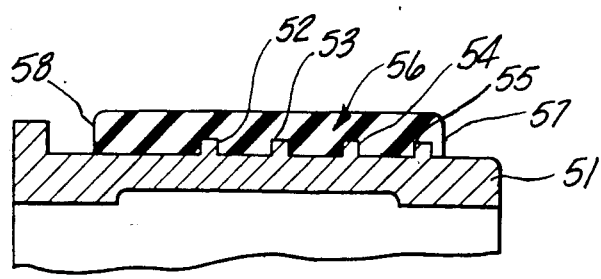
FIG. 3 is a partial cross-sectional view, in part similar to FIG. 2, showing another embodiment of the invention.

FIG. 3 illustrates another embodiment of the invention. In this embodiment, only the construction of the elastomeric sleeve and its cooperation with the inner sleeve differs from the embodiment of FIGS. 1 and 2 and for that reason only these two components have been illustrated. In this embodiment, an inner sleeve 51 is provided that has a plurality of outwardly extending circumferential ridges 52, 53, 54 and 55. An elastomeric sleeve, indicated generally by the reference numeral 56, is received around the inner sleeve 51 in an asymmetric relationship to the ridges 52, 53, 54 and 55. The outer periphery of the elastomeric sleeve 56 is in engagement with a bore of the propeller hub, as previously noted, for example, the bore 29 of the hub 28 as in the embodiment of FIGS. 1 and 2.

The ribs 52 through 55 will provide stiffening in an axial direction without increasing the stiffness of the sleeve 56 in a torsional or circumferential direction. Therefore, a more rigid sleeve may be used than was employed with the prior art constructions so that torsional damping can be increased without sacrificing the rigidity in the axial driving direction. The asymmetric relationship between the sleeve 56 and the rigdes 52 throough 55, however, is such that the sleeve is more rigid in a forward driving direction than in a rearward driving direction. To this end, the ridge 55 is positioned closer to an end 57 of the sleeve 56 than the distance between the rib 52 and the opposite sleeve end 58. Thus, as with the embodiment of FIG. 1 and 2, the sleeve 56 and its relation to the remaining elements of the coupling is such that it provides more resilience in a torsional direction than in an axial direction and more resilience in the reverse axial direction than in the forward axial direction.

Figure 4:
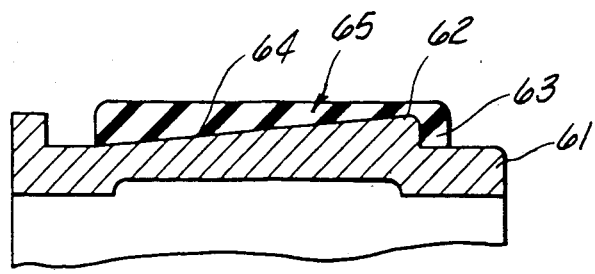
FIG. 4 is a partial cross-sectional view, in part similar to FIGS. 2 and 3, showing a still further embodiment of the invention.

In the embodiments thus far described, the coupling has been designed so as to provide more axial rigidity in a forward direction than in a reverse direction. In each of the previously described embodiments, this is achieved by changing the effective length of the elastomeric sleeve in the two directions. In addition to achieving this result by changing the length of the sleeve, it may also be achieved by changing the volume of the sleeve that is effective to resist the loading in the opposite directions. FIG. 4 shows an embodiment wherein the different axial resiliences are achieve by changing both length and volume of the sleeve.

In the embodiment of FIG. 4, like the embodiment of FIG. 3, only the elastic element and the inner sleeve have been shown. The cooperation of these elements with the drive and the propeller is the same as the embodiment of FIGS. 1 and 2 and, for that reason, these other components have not been illustrated in this figure.

In this embodiment, an inner sleeve 61 is provided that has a raised surface 62 that defines a circumferentially extending shoulder 63 and a forward tapered portion 64. An elastic sleeve, indicated generally at 65, is received around the inner sleeve 61 and has a configuration which matches that of the projection 62, shoulder 63 and inclined portion 64. It should be readily apparent that the portion of the sleeve 65 to the right of the shoulder 63 will resist axial forces in the forward driving direction. Since a relatively small volume of the sleeve 65 is disposed in this area, the coupling will have relatively high rigidity in the forward direction. A substantially greater volume of the sleeve 65 is, however, interposed between the shoulder 62 and inclined portion 64 in the direction of reverse thrust. Since the configuration of the projection on the inner sleeve 61 extends circumferentially, however, there will be no decrease in the torsional or circumferential resilience of the sleeve 65 and hence this can be considerably higher than the resilience in the axial directions.

Figure 5:
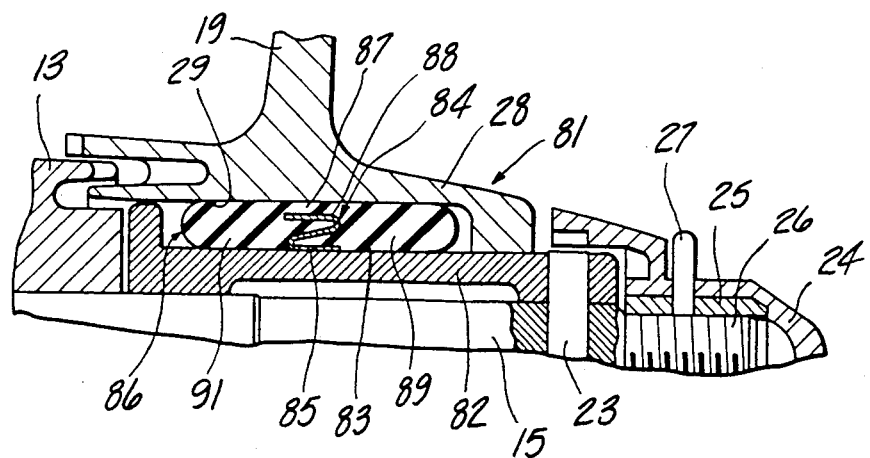
FIG. 5 is a cross-sectional view, in part similar to FIG. 2, and showing a still further embodiment of the invention.

In the previously described embodiments of FIGS. 1 and 2, 3 and 4, the increased rigidity in the axial direction has been provided by a projection on the inner sleeve that engages the elastomeric sleeve so as to divide it into one or more axial components having different resiliences. With these arrangements, however, there may be some risk of abrasion or wear of the elastomeric sleeve. This results from the fact that the elastomeric sleeve may move slightly relative to the inner sleeve projection. FIG. 5 illustrates an embodiment wherein a construction is employed for resistng such abrasion. In this embodiment, the driving shaft and propeller are generally the same as the embodiment of FIGS. 1 and 2 and for that reason these components have been identified by the same reference numerals in conjunction with the embodiments of FIGS. 1 and 2. The elements which have the same or substantially the same construction as the embodiment of FIGS. 1 and 2 will not be described again in particular detail, except insofar as may be necessary to understand the construction and operation of this embodiment.

In this embodiment, a coupling for connecting the propeller 19 to the driving shaft 15 is identified generally by the reference numeral 81. As with the embodiment of FIGS. 1 and 2, the propeller 19 has a hub portion 28 that is formed with a generally cylindrical inner surface 29.

An inner sleeve 82 is incorporated in the embodiment that has a generally cylindrical outer surface 83. The inner sleeve 82 is affixed to the driving shaft 15 by means of a shear pin 23 in the same manner as described in conjunction with the embodiment of FIGS. 1 and 2.

In accordance with this embodiment, an annular metal insert 84 is provided that has a generally reverse S shaped cross-section as shown clearly in the figure. An inner surface 85 of the insert 84 is affixed, as by welding, or any other manner to the outer surface 83 of the inner sleeve 82. An elastomeric sleeve, indicated generally by the reference numeral 86, is molded or otherwise formed around the inner sleeve 82 and encasing the insert 84 so as to provide a slight gap 87 between an outer surface 88 of the insert 84 and the propeller inner surface 29. The elastomeric sleeve 86 is bonded around the insert 84 so as to be divided into two unequal length portions 89 and 91 similar to the previous embodiments. The portion 89 has less axial length than the portion 91 so that the coupling arrangement 81 will have more resilience in the reverse drive direction than in the forward drive direction. However, the resilience in the circumferential or torsional direction is considerably greater than either axial resilience so that driving thrust may be taken while affording good vibration damping as with the previously described embodiments.

It should be readily apparent that several embodiments have been disclosed that offer the advantage of achieving high resilience in a circumferential direction for absorbing vibrations, while at the same time offering relatively higher resilience in an axial direction so as to absorb driving thrusts. In addition, the arrangements of each embodiment is such that the coupling is adapted to absorb higher axial forces in the forward drive direction than in the reverse drive direction. Said another way, the coupling has more resilience in the reverse drive direction than in the forward drive direction. In each embodiment, either a protuberance or element that has been fixed to the inner sleeve is employed for achieving these different axial resiliences without adversely affecting the circumferential resilience. It is believed to be obvious to those skilled in the art that the dividing member may be affixed to the propeller hub rather than to the inner sleeve. If this is done, however, the differences in resilience must be reversed due to the difference in the manner in which the elastomeric element is loaded. That is, if the protuberance of the embodiment of FIGS. 1 and 2 were to be formed on the propeller hub 28 rather than on the inner sleeve 22, the length of the section 34 should be greater than the length of the section 33. Similar arrangements are true with regard to the other embodiments if such a reversal takes place.

Although a number of embodiments of the invention have been illustrated and described, various other changes and modifications may be made without department from the spirit and scope of the invention, as defined by the appended claims.

What is claimed is:

1. A coupling arrangement for drivingly connecting a propeller to a driving shaft comprising means for supporting said propeller relative to said driving shaft for movement axially in either direction and circumferentially, and resilient means interposed between said driving shaft and said propeller, a first portion of said resilient means being fixed relative to said propeller, a second portion of said resilient means being fixed relative to said driving shaft for transmission of both circumferential and axial forces in either direction between said driving shaft and said propeller, said resilient means being more resilient in a circumferential direction than in an axial direction for absorbing torsional vibrations while offering more rigid resistance to axial displacement.

2. A coupling arrangement as set forth in claim 1 wherein the resilient mean comprises an elastomeric sleeve.

3. A coupling arrangement as set forth in claim 2 wherein the elastomeric sleeve is made more resilient in a circumferential direction than in an axial direction by providing a circumferentially extending stiffening member that extends into the elastomeric sleeve.

4. A coupling arrangement as set forth in claim 3 wherein the circumferentially extending stiffening member comprises a circumferentially extending rib.

5. A coupling arrangement as set forth in claim 4 wherein the circumferentially extending stiffening member divides the elastomeric sleeve into portions having different axial volumes so that the sleeve has more resilience in one axial direction than in the other axial direction.

6. A coupling arrangement as set forth in claim 4 wherein there are a plurality of stiffening ribs.

7. A coupling arrangement as set forth in claim 6 wherein the circumferentially extending stiffening member divides the elastomeric sleeve into portions having different axial volumes so that the sleeve has more resilience in one axial direction than in the other axial direction.

8. A coupling arrangement as set forth in claim 4 wherein the circumferentially extending stiffening member comprises a tapered circumferential member.

9. A coupling arrangement as set forth in claim 8 wherein the taper of the circumferential member is such so as to provide a different volume of the elastic sleeve on one side of the tapered member than on the other so as to provide different degrees of stiffness in opposite axial directions.

10. A coupling arrangement as set forth in claim 3 wherein the stiffening member comprises an insert molded into the elastomeric sleeve.

11. A coupling arrangement for drivingly connecting a propeller to a driven shaft comprising means for supporting said propeller relative to said driving shaft for movement axially in either direction and circumferentially, and resilient means interposed between said driving shaft and said propeller, a first portion of said resilient means being fixed relative to said propeller, a second portion of said resilient means being fixed relative to said driving shaft for transmission of both circumferential and axial forces in either direction between said driving shaft and said propeller, said resilient means being more resilient in one axial direction than in another axial direction.

12. A coupling arrangement as set forth in claim 11 wherein the resilient mean comprises an elastomeric sleeve.

13. A coupling arrangement as set forth in claim 12 wherein the elastomeric sleeve is made more resilient in one axial direction than in the other axial direction by providing a circumferentially extending stiffening member that extends into the elastomeric sleeve.

14. A coupling arrangement asset forth in claim 13 wherein the circumferentially extending stiffening member comprises a circumferentially extending rib.

15. A coupling arrangement as set forth in claim 14 wherein the circumferentially extending stiffening member divides the elastomeric sleeve into portions having different axial volumes so that the sleeve has more resilience in one axial direction than in the other axial direction.

16. A coupling arrangement as set forth in claim 14 wherein there are a plurality of stiffening ribs.

17. A coupling arrangement as set forth in claim 16 wherein the circumferentially extending stiffening member divides the elastomeric sleeve into portions having different axial volumes so that the sleeve has more resilience in one axial direction than in the other axial direction.

18. A couping arrangement as set forth in claim 14 wherein the circumferentially extending stiffening member comprises a tapered circumferential member.

19. A coupling arrangement as set forth in claim 18 wherein the taper of the circumferential member is such so as to provide a different volume of the elastic sleeve on one side of the tapered member than on the other so as to provide different degrees of stiffness in opposite axial directions.

20. A coupling arrangement as set forth in claim 13 wherein the stiffening member comprises an insert molded into the elastomeric sleeve.

21. A coupling arrangement for drivingly connecting a propeller to a driving shaft comprising means for supporting said propeller relative to said driving shaft for movement axially in either direction and circumferentially, and resilient means interposed between said driving shaft and said propeller, a first portion of said resilient means being fixed relative to said propeller, a second portion of said resilient means being fixed relative to said driving shaft for transmission of both circumferential and axial forces in either direction between said driving shaft and said propeller, said resilient means being operative to provide resilience in both a circumferential direction and in an axial direction with more resilience in one direction than the other.

22. A claim in accordance with claim 21, wherein the resilient means comprises elastomeric means.

* * * * *